United States Patent

[11] 3,568,736

| [72] | Inventors | Richard E. Linch<br>Chilton, Wis.;<br>Ralph K. Boyer, Roxboro, N.C. |
|---|---|---|
| [21] | Appl. No. | 664,466 |
| [22] | Filed | Aug. 30, 1967 |
| [45] | Patented | Mar. 9, 1971 |
| [73] | Assignee | Western Industries, Inc.<br>Milwaukee, Wis. |

[54] PORTABLE INFLATOR
5 Claims, 5 Drawing Figs.

[52] U.S. Cl. .................................................. 141/349,
141/370, 137/614.04, 251/149.6
[51] Int. Cl. .................................................. B65b 1/04,
B65b 3/04, B67c 3/28
[50] Field of Search ......................................... 141/346,
347, 348, 349, 350, 370, 38; 137/223, 231, 234.5,
614.02, 614.03, 614.04, 614.05, 614.06,
(Inquired); 251/149.6, 149.7, 291, 149.5,
(Inquired); 222/(Inquired); 152/(Inquired);
9/(Inquired)

[56] References Cited
UNITED STATES PATENTS

| 1,672,755 | 6/1928 | Engelbert ..................... | 251/149.7 |
|---|---|---|---|
| 2,536,231 | 1/1951 | Simanton ..................... | 251/291 |
| 2,925,103 | 2/1960 | Kerr et al. ..................... | 141/349 |
| 3,280,879 | 10/1966 | Simms ........................... | 137/614.05 |
| 3,329,180 | 7/1967 | Van Brocklin ............... | 141/349 |

FOREIGN PATENTS

| 1,360,204 | 3/1964 | France ......................... | 137/614.03 |

*Primary Examiner*—Houston S. Bell, Jr.
*Attorney*—Lieber & Nilles

ABSTRACT: A portable container housing compressed gas and having valve means for automatically transferring the contents of the container directly to a vehicle tire or similar device requiring inflation upon coupling the container valve means to the valve of the tire or other device.

PATENTED MAR 9 1971

Inventors
R. E. Linch
R. K. Boyer
By Lieber & Nilles
Attorneys

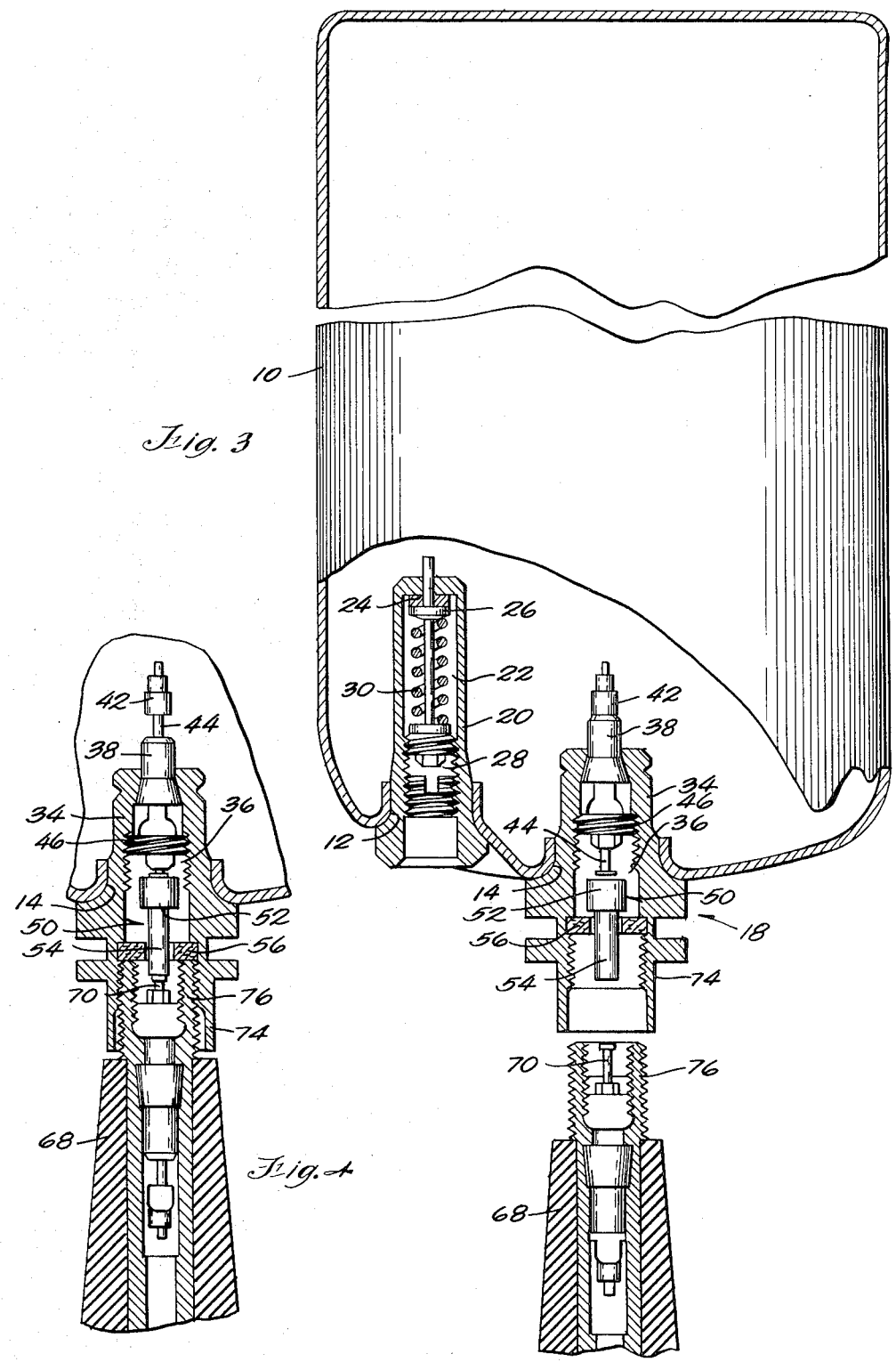

PORTABLE INFLATOR

BACKGROUND OF THE INVENTION

It has long been common practice to provide automotive vehicles with a spare tire for use in replacing one which has been punctured or which has otherwise become deflated. Normally, these spare tires are mounted on a rim or wheel and are necessarily maintained in inflated condition for use when needed. These inflated spare tires are then usually stored in the trunk of the automobile until required for replacement of a punctured tire.

These inflated spare tires accordingly require periodic surveillance to insure that they are maintained in properly inflated condition. Furthermore, they are heavy and bulky and therefore difficult for the average motorist to remove and otherwise handle. Above all, an inflated spare tire requires considerable storage space and necessarily reduces the amount of available trunk space, space for luggage and sundry other articles. This particular objection is, of course, greatly exaggerated in the smaller compact type vehicles.

Recently, it has been proposed to replace the usual inflated spare tire with one which is collapsed or deflated and to provide a portable device for inflating the tire only when it becomes necessary to use the same, thus eliminating or at least minimizing the aforesaid objections. The portable tire inflators heretofore proposed for such purpose have consisted generally of a cylindrical container filled with a supply of compressed liquified gas and having a dispensing valve associated therewith attachable to the tire valve through a special adapter.

While these portable tire inflators serve the purpose of inflating the spare tire for temporary emergency usage, they have all heretofore required the use of a special adapter for coupling the same to the tire valve, and these adapters are subject to loss, breakage and improper application and usage by a novice. Then too, the special adapters require a number of separate operations for application thereof to the inflator and to the tire valve. Furthermore, once the inflator is coupled for the tire inflation operation, it is virtually impossible to discontinue or halt the operation without loss of the fluid being transferred, and in most instances, these is even an undesirable loss of the inflation medium immediately following the inflation operation upon uncoupling the adapter.

SUMMARY OF THE INVENTION

It is accordingly an important object of the present invention to provide an improved portable tire inflator which is highly efficient in use for emergency inflation of a spare vehicle tire and which obviates the aforesaid disadvantages of the inflators previously available for like purposes.

Another object of the invention is to provide an improved portable tire inflator which is entirely self-contained and which requires no piercing of seals or caps and no special adapters or coupling means whatsoever for application to ordinary tire valves.

A further object of the invention is to provide an improved self-contained portable tire inflation device which is directly applicable to the tire valve in a simplified manner for effective transfer of the contents of the container to the tire without any appreciable loss of fluid being transferred either upon application of the device to the tire valve or upon removal of the same therefrom.

An additional object of the invention is to provide an improved portable tire inflation device which is adapted to be rapidly emptied of its contents upon direct application to the tire valve and by direct action of the tire valve so as to thereby reduce the tire inflation time and assure maximum transfer of the contents of the inflator to the tire being filled.

Still another object of the present invention is to provide an improved portable tire inflator which comprises generally, a container housing a supply of liquified gas under pressure having a closure plug for an opening therein, the closure plug containing a first valve member, a second valve member having a stem extending through a passageway in the first valve member and provided with a head normally seated on the first valve member to close the passageway, and a valve actuator housed within the plug and freely axially movable into contact with the stem of the second valve member for unseating the head thereof to open the passageway of the first valve member and thereby release liquified gas from the container to the valve of a tire to be inflated.

These and other objects and advantages of the present invention will become apparent from the further detailed description.

THE DRAWINGS

A clear conception of a portable tire inflating device embodying the present improvements and of the mode of utilizing the same in inflating a tire may be had by referring to the drawings accompanying and forming a part of this specification, wherein like reference characters indicate the same or similar parts in the several views.

FIG. 3 is a fragmentary part-sectional view of a somewhat modified tire inflation device embodying the improvements and showing the same in the process of being applied to an ordinary tire valve stem;

FIG. 4 is another fragmentary sectional view showing the inflator of FIG. 3 applied to the tire valve and in open condition for transferring the contents of the container to the tire.

DETAILED DESCRIPTION

Figure 1:
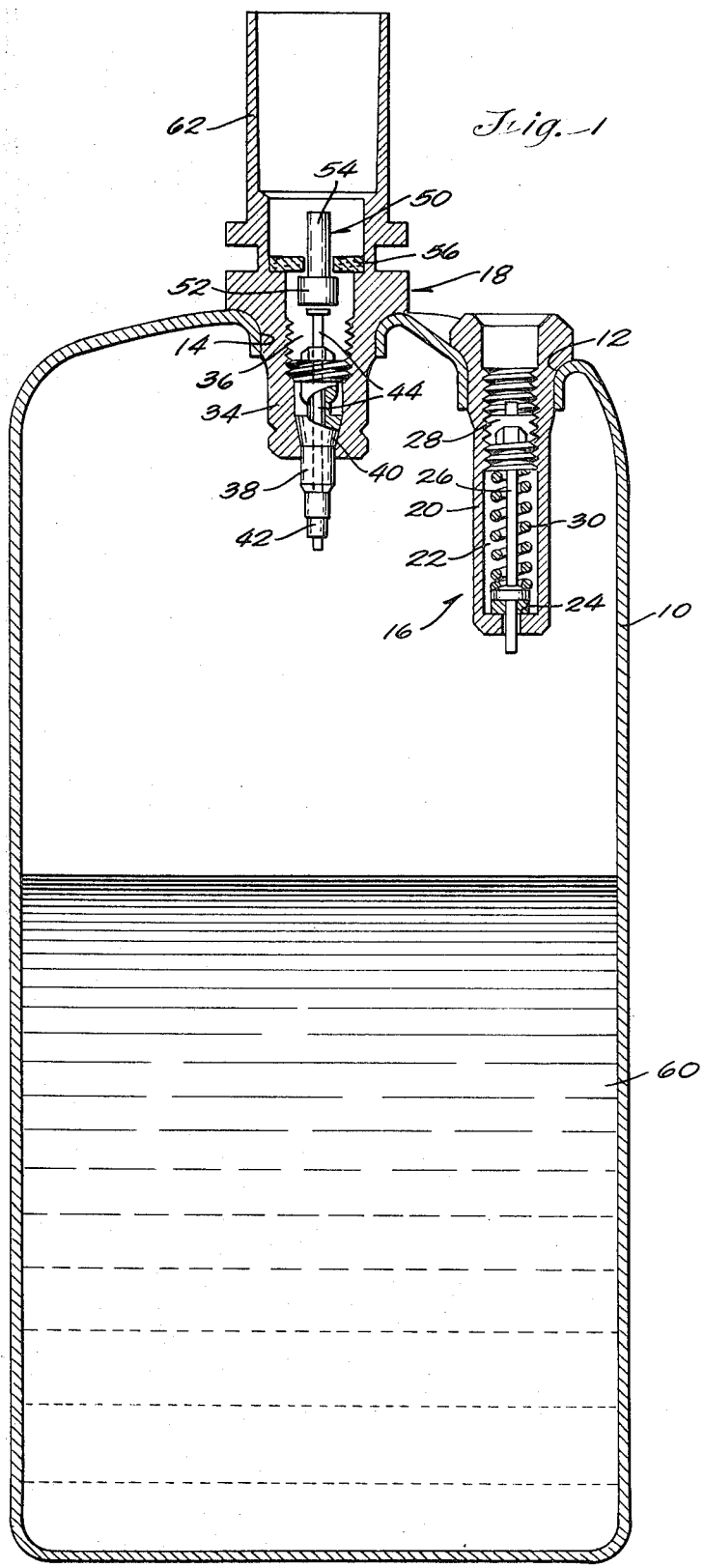
FIG. 1 is a vertical transverse section through a typical portable tire inflator embodying the present invention and showing the dispensing valve thereof in closed condition to seal the container and prevent escape of its contents.

Referring to the drawings, the portable tire inflator shown therein as embodying the invention comprises a cylindrical container 10 adapted to receive a supply of liquified gas under pressure. The container 10 may be formed of sheet metal in a well-known manner and is preferably provided with a pair of spaced openings 12 and 14 in an end wall thereof. Secured within the opening 12 is a pressure relief valve assembly generally designated by the numeral 16. Similarly secured within the opening 14 is a valve assembly generally designated by the numeral 18. The valve assembly 16 provides for the relief of excessive pressures within the container 10, and the valve assembly 18 provides means for filling the container 10 with a supply of liquified compressed gas and for dispensing the same from the container 10 when desired.

The relief valve assembly 16 may be of any known type adapted to open when a predetermined pressure is exceeded within the container. As shown herein, the relief valve assembly includes a cylindrical body 20 having a threaded bore 22 extending longitudinally therethrough and provided with a reduced portion forming a valve seat 24 as its inner end. A valve member 26 is confined within the bore 22 of the body 20 by a retainer 28, the valve member 26 being constantly urged toward seated position against the seat 24 as by means of a compression spring 30 or the like. The spring 30 is compressed between the threaded member 28 and the enlarged head of the valve member 26 to normally maintain the member 26 in seated condition, and the force of the spring 30 may be varied by adjusting the position of the retainer 28 along the threaded portion of the body 20. Thus, the relief valve is normally maintained in closed condition except when excessive pressures exist in the container 10, at which time the force of the spring 30 is overcome and the valve is opened.

The valve assembly 18 comprises generally a plug or a generally cylindrical body 34 secured within the opening 14 and having a central partially threaded bore 36 extending longitudinally therethrough into communication with the interior of the container 10. The bore 36 of the plug 34 is adapted to receive a tire valve generally designated 38. This tire valve 38 may be of usual construction and includes a first valve member 40 seated within the inner end of the bore 36 and a second valve member 42 having a stem 44 extending loosely through an axial passageway in the first valve member, the second valve member 42 being exposed to the interior of the container 10 and being normally seated on the first valve member 40 to close the passageway extending therethrough. The tire valve 38 may be retained in position within the bore of the threaded plug as by means of a threaded retainer member 46, and while the second valve member 42 is normally urged toward seated position on the first valve member 40 by pressures existing within the container 10, a spring may be provided for positively maintaining and returning the second valve member 42 to seated condition on the first valve member 40 in a customary manner.

In accordance with the present invention, a valve actuator generally designated 50 is also housed within the bore of the plug 34. This actuator 50 is shown as comprising a cylindrical body or spool portion 52 loosely received within the bore 36 of the plug 34 remote from the valve members 40, 42. The spool 52 has a stem portion 54 projecting axially therefrom in a direction away from the valve members 40, 42 and the interior of the container 10 and the actuator thus formed by the spool 52 and stem 54 is movable independently of the stem 44 of the valve member 42 into and out of contact with the stem 44. The valve actuator 50 while being independently axially movable is retained or held captive within the bore 36 of the plug 34 by a gasket or washer 56 which restricts outward movement of the actuator.

It is thus apparent that the container 10 may be supplied with liquified gas under pressure through the valve assembly 18, the actuator 50 being moved axially into contact with the end of the valve stem 44 to unseat the valve member 42 during the filling operation. The container 10 is thus filled with the desired quantity of liquified compressed gas generally designated by the numeral 60, and when filled, the valve member 42 will automatically seat on the valve member 40 to retain the liquified gas 60 within the container 10.

Figure 2:
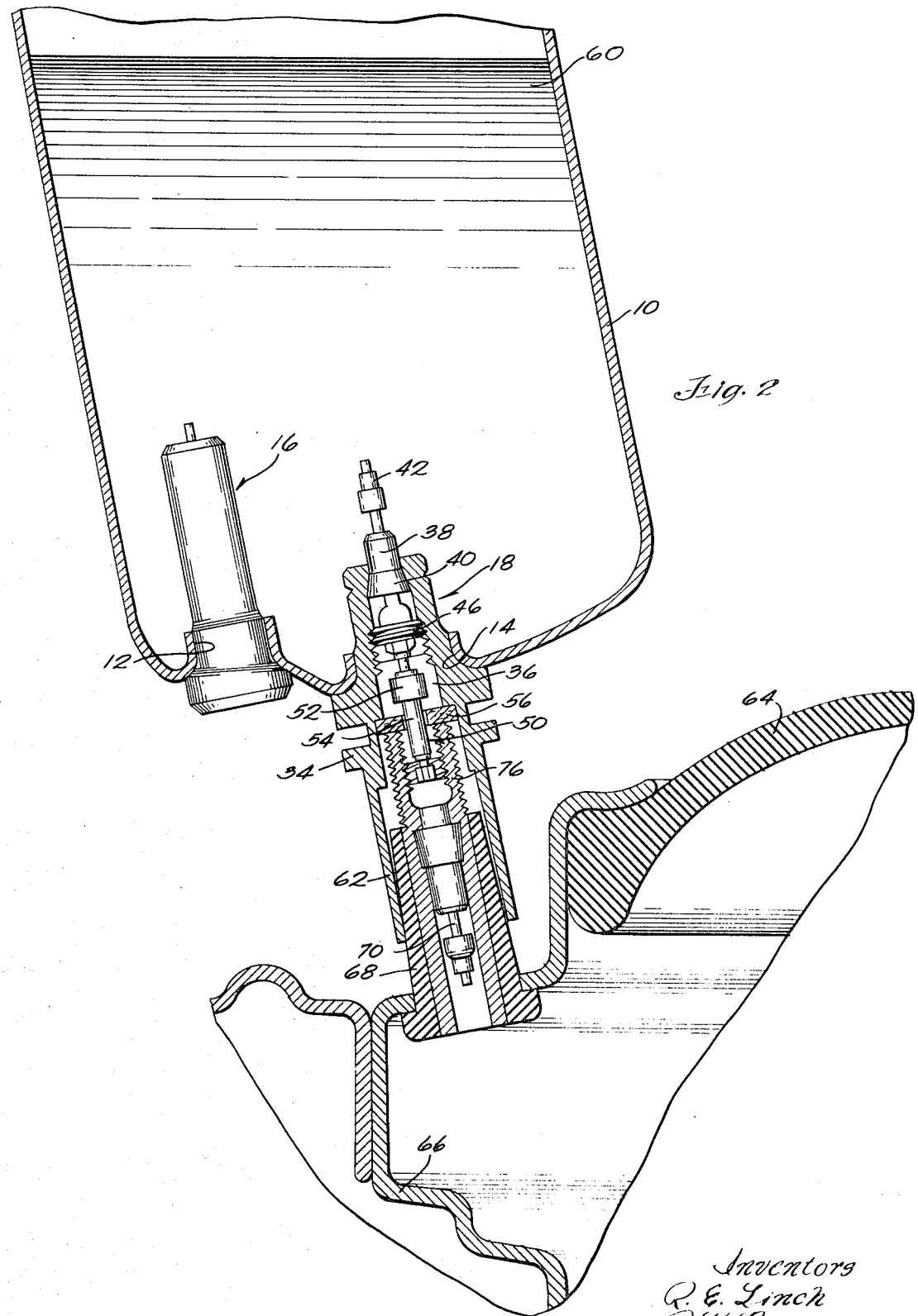
FIG. 2 is a transverse section showing the inflator of FIG. 1 applied to the valve stem of a tire for the purpose of inflating the same and with the dispensing valve shown in open condition.

In the embodiment of FIGS. 1 and 2, the stem 54 of the actuator 50 which projects loosely through the axial opening in the gasket 56 is surrounded by an annular shield or skirt 62. The stem 54 of the actuator 50 is thus protected from tampering and/or inadvertent release of the compressed fluid within the container. This annular skirt 62 also performs the additional function of sealing the valve assembly 18 upon application thereof to a tire valve stem for transfer of the compressed liquified gas to the tire as will hereinafter more fully appear. Thus, when it is desired to transfer the contents 60 of the container 10 to a tire 64 mounted in the usual manner on a rim 66, it is only necessary to place the open nozzle of the valve assemblage 18 as provided by the annular skirt 62 over the end of tire valve stem 68 as shown in FIG. 2. Upon exerting pressure against the container 10 in a direction toward the tire valve stem 68, the axially movable valve stem 70 of the tire valve assembly 68 will contact the stem 54 of the actuator 50. Initially, this will cause the tire valve of the assemblage 68 to open, and the valve 38 of the inflator will momentarily remain closed due to the excess pressure in the container 10 over that existing in the tire 64. Subsequently, the valve stem 44 is caused to move inwardly by the action of the actuator 50 as contacted by the stem 70 of the tire valve assembly. This causes the valve member 42 to unseat, and with both of the valves 38 and 68 open, the contents of the container 10 will be transferred to the tire 64 to thereby fill the same.

Figure 5:
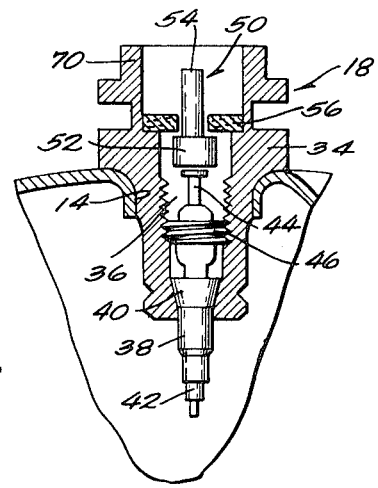
FIG. 5 is a fragmentary sectional view of a further modified tire inflation device.

The tire inflator shown in FIGS. 3 and 4 is essentially the same as that shown in FIGS. 1 and 2 except that a threaded connection is provided between the valve assembly 18 of the inflator and the tire stem valve assembly 68. As shown, the annular skirt 62 of the device of FIGS. 1 and 2 is eliminated and is replaced by an internally threaded coupling portion 74. Otherwise, the construction of the valve assemblage is identical to that described, but in use, the coupling portion 74 is threaded onto the externally threaded end 76 of the tire valve stem assemblage 68. With respect to the inflator of FIG. 5, both the annular skirt 62 and the threaded coupling 74 have been eliminated, but the valve is otherwise identical.

In any case, the valve assembly 18 should be so designed that the gasket 56 provides a seal between the end of the tire stem and the inflator as shown in FIG. 2 and 4, and when properly designed so that the gasket 56 provides a good seal between the inflator and the threaded end of the tire stem, it is also possible to omit the annular skirt 62 as well as the threads 74. In any event, the operation of the device is identical, and as the inflator is brought into contact with the valve stem, the actuator or depressor 50 will contact both the inflator valve stem 44 and the tire valve stem 70 simultaneously. Then, as closer contact is made, the depressor will attempt to open both the tire stem valve and the inflator valve, but as the inflator contains pressurized fluid, the additional pressure acting upon the valve member 42 will cause the inflator valve to remain closed until the tire valve is open thus insuring against loss of the inflator medium.

In the improved device, a suitable liquified compressed gas is utilized, and this gas may be selected from any of those mentioned in U.S. Pat. No. 3,047,040, dated Jul. 31, 1962, to T. A. O. Gross, but other gases may be found suitable for use in the container 10. When any compressed liquified gas is permitted to boil off to vapor or gas state, it will act as a refrigerant and will absorb heat. The gas will then take this heat from the container 10 and will be transferred to the tire 64, and in this process, it will cool the inflator, the tire and the gas itself.

At normal temperatures ranging from 50° to 80°, the heat available is sufficient to inflate a tire. However, at lower temperatures the gas will absorb enough heat from itself and from the inflator to reduce its temperature to the point where it will not boil off fast enough to inflate the tire quickly. Thus, it is desirable for best operation in use to operate the inflator with its valve assemblage 18 directed downwardly as shown in the drawings. The vapor pressure in the inflator will then force the liquid into the tire. The liquid will then vaporize in the tire due to the reduced pressure and the heat absorbed from the tire, and at the same time the liquid will vaporize in the inflator to equalize the loss of pressure in the inflator. Therefore, if the inflator were attached to the tire 64 in a manner whereby the liquid level in the container 10 is below the outlet fitting 18, nothing but vapor would enter the tire unless sufficient time is given to the filling process.

While the improved inflator has been shown and described herein as being particularly useful for inflating vehicle tires, it is apparent that the application thereof need not be thus limited, since these inflators may be used to advantage for inflating diverse other devices. However, whatever device is to be inflated must include a valve stem or other means cooperable with the valve actuator 50 to move the same axially and thereby unseat the valve member 42.

Various modes of carrying out the invention are contemplated as being within the scope of the following claims particularly pointing out and distinctly claiming the subject matter which is regarded as the invention.

We claim:

1. A portable inflator comprising, a container housing a supply of gas under pressure, said container having an opening formed in a wall thereof, a plug secured within the opening in said container wall and having a bore extending therethrough in communication with the interior of said container, a first valve member seated within said bore adjacent the inner end thereof and having a passageway extending therethrough, a second valve member having a stem extending loosely through the passageway of said first valve member and terminating in a head exposed to the interior of said container and normally seated on said first valve member to close said passageway, a stationary flatefaced gasket having an aperture and firmly held across the bore of said plug and a valve actuator held captive for free axial movement within the aperture of said gasket remote from said first valve member and having an actuating portion for actuating a valve in the article to be inflated, said portion extending through said aperture, the end of the valve stem of the article to be inflated being seated in sealing contact on the flat face of said gasket, said actuator being independently movable axially into contact with the stem of said second valve member to unseat the head thereof and thereby open the passageway of said first valve member to release gas from the container.

2. A portable inflator for tires or the like according to claim 1, wherein the plug has an annular skirt surrounding and projecting outwardly from the valve actuator and circumferentially engageable with the stem of a tire valve during the tire inflation operation.

3. A portable inflator for tires or the like according to claim 1, wherein the plug has an annular outwardly open and internally threaded portion surrounding the valve actuator for reception on the threaded outer end of a tire valve.

4. A portable inflator according to claim 1, wherein the actuator terminates at its inner end in a head of greater diameter than the opening in the gasket and of smaller diameter than the bore of the plug.

5. A dispensing valve assemblage for use with a pressurized container, said valve assemblage comprising, a closure for the container having a bore extending therethrough, a first valve member seated within said bore adjacent the inner end thereof and having a passageway extending therethrough, a second valve member having a stem extending loosely through the passageway of said first valve member and terminating in a head normally seated on said first valve member to close said passageway, a stationary flat-faced gasket having an aperture and firmly held across the bore of said closure, and a valve actuator held captive for free axial movement within the aperture of said closure remote from said first valve member and having an actuating portion for actuating a valve in the article to be inflated, said portion extending through said aperture, the end of the valve stem of the article to be inflated being seated in sealing contact on the flat face of said gasket, said actuator being independently movable axially into contact with the stem of said second valve member to unseat the head thereof and thereby open the passageway of said first valve member, said closure having an annular, internally smooth skirt surrounding and projecting outwardly from the valve actuator and circumferentially engageable with the stem of a tire valve during the tire inflation operation.